(12) United States Patent
Poleg et al.

(10) Patent No.: US 10,098,062 B2
(45) Date of Patent: Oct. 9, 2018

(54) METHOD AND SYSTEM FOR SCHEDULING TRANSMIT TIME SLOTS FOR NETWORK-CONNECTED MEASUREMENT UNITS

(71) Applicant: Ayyeka Technologies Ltd., Jerusalem (IL)

(72) Inventors: Yair Poleg, Nes-Harim (IL); Ariel Stern, Lachish (IL)

(73) Assignee: AYYEKA TECHNOLOGIES LTD, Jerusalem (IL)

( * ) Notice: Subject to any disclaimer, the term of this patent is extended or adjusted under 35 U.S.C. 154(b) by 0 days.

(21) Appl. No.: 15/220,436

(22) Filed: Jul. 27, 2016

(65) Prior Publication Data

US 2017/0127348 A1    May 4, 2017

(30) Foreign Application Priority Data

Oct. 28, 2015 (GB) .................................. 1519069.7

(51) Int. Cl.
*G08C 17/00* (2006.01)
*H04W 52/02* (2009.01)
(Continued)

(52) U.S. Cl.
CPC ....... *H04W 52/0203* (2013.01); *H04L 43/045* (2013.01); *H04W 72/0446* (2013.01); *Y02D 70/00* (2018.01)

(58) Field of Classification Search
CPC . H04W 52/00; H04W 52/02; H04W 52/0203; H04W 52/0206; H04W 52/0209; H04W 52/0212; H04W 52/0216; H04W 52/0219; H04W 52/0225; H04W 52/0232; H04W 52/0248; H04W 52/0251; H04W 52/0258; H04W 72/0446; H04L 43/045
See application file for complete search history.

(56) References Cited

U.S. PATENT DOCUMENTS 6,498,932 B1 * 12/2002 Silventoinen ......... H04W 16/24
                                                          455/424
6,781,978 B1 *  8/2004 Xie ....................... H04W 28/06
                                                          370/338
(Continued)

FOREIGN PATENT DOCUMENTS

EP    2728958         5/2014
GB    2506150         3/2014
WO    WO 2012/167807  12/2012

OTHER PUBLICATIONS

Great Britian Office Action of Great Britian Application No. GB1519069.7 dated Apr. 29, 2016.

*Primary Examiner* — Kevin Mew
(74) *Attorney, Agent, or Firm* — Pearl Cohen Zedek Latzer Baratz LLP (57) ABSTRACT

Provided herein a system and a method that may include the following steps: receiving data from one or more sensors configured to measure one or more predefined metrics of an infrastructure; establishing a wireless channel with a wireless network; obtaining time-varying characteristics of the wireless network; and determining a series of transmission time slots for transmitting the data received from the sensor, based on the time-varying characteristics, for reducing overall power consumption of the data transmission.

20 Claims, 5 Drawing Sheets

(51) Int. Cl.
  *H04L 12/26* (2006.01)
  *H04W 72/04* (2009.01)

(56) References Cited

U.S. PATENT DOCUMENTS

| | | | | |
|---|---|---|---|---|
| 7,065,365 | B2* | 6/2006 | Horanieh | H04B 1/7103 370/320 |
| 9,307,427 | B2* | 4/2016 | Bodas | H04W 24/08 |
| 9,930,661 | B2* | 3/2018 | Park | H04W 72/0446 |
| 2002/0003782 | A1* | 1/2002 | Pan | H04B 1/7103 370/280 |
| 2002/0031105 | A1* | 3/2002 | Zeira | H04B 1/69 370/337 |
| 2002/0105918 | A1* | 8/2002 | Yamada | H04B 7/2643 370/294 |
| 2005/0113087 | A1* | 5/2005 | Rick | H04W 68/00 455/434 |
| 2005/0143121 | A1* | 6/2005 | Huh | H04W 52/10 455/522 |
| 2006/0073791 | A1* | 4/2006 | Senarath | H04W 52/146 455/67.13 |
| 2007/0100222 | A1* | 5/2007 | Mastrototaro | A61B 5/01 600/365 |
| 2007/0211751 | A1* | 9/2007 | Yoshikawa | H04W 74/0825 370/447 |
| 2013/0208607 | A1* | 8/2013 | Abraham | H04W 74/0816 370/252 |
| 2013/0227569 | A1* | 8/2013 | Kohli | G06F 9/455 718/1 |
| 2013/0234536 | A1* | 9/2013 | Chemishkian | H02J 17/00 307/149 |
| 2013/0242812 | A1* | 9/2013 | Khoryaev | H04W 52/243 370/278 |
| 2014/0313909 | A1* | 10/2014 | Doherty | H04W 24/02 370/252 |
| 2016/0066226 | A1* | 3/2016 | Igarashi | H04L 65/4076 370/331 |
| 2016/0302195 | A1* | 10/2016 | Zhang | H04W 72/0446 |
| 2017/0055104 | A1* | 2/2017 | Wegelin | H04W 84/20 |
| 2017/0359784 | A1* | 12/2017 | Kumar | H04W 52/225 |

* cited by examiner

London SW1

| Hour \ Day | SUN | MON | TUE | WED | THU | FRI | SAT |
|---|---|---|---|---|---|---|---|
| 12am | -70 | -70 | -63 | -68 | -71 | -68 | |
| 2am | -65 | -66 | -65 | -67 | -65 | -65 | -66 |
| 4am | -69 | -63 | -65 | -69 | -67 | -70 | -70 |
| 6am | -65 | -66 | -63 | -66 | -65 | -66 | -66 |
| 8am | | -61 | -71 | | | | |
| 10am | -74 | -65 | -68 | -68 | -69 | -68 | -68 |
| 12pm | | -66 | -77 | | | | |
| 2pm | -67 | -65 | -73 | -66 | -66 | -66 | -67 |
| 4pm | -61 | -66 | -67 | -67 | -68 | -69 | -70 |
| 6pm | -66 | -61 | -67 | -66 | -65 | -67 | -66 |
| 8pm | -68 | -65 | -69 | -67 | -69 | -68 | -80 |
| 10pm | -66 | -65 | -67 | -65 | -67 | -67 | -65 |

METHOD AND SYSTEM FOR SCHEDULING TRANSMIT TIME SLOTS FOR NETWORK-CONNECTED MEASUREMENT UNITS

CROSS-REFERENCE TO RELATED APPLICATIONS

This application is claims priority of Great Britain Patent Application No. GB 1519069.7, filed Oct. 28, 2015, which is hereby incorporated by reference.

FIELD OF THE INVENTION

The present invention relates generally to the field of sensor networks, and in particular, such networks that include sensors that transmit measurements via a wireless channel.

BACKGROUND OF THE INVENTION

Many infrastructure systems such as water pipes and drainage systems require measurements of their operation on an ongoing basis. Sensors, of many kinds and types, are being deployed on site in order to measure various metrics and transmit the measurements, usually via a communication network, to a centralized control center, where the data is being analyzed. These sensors are usually energetically autonomous and are equipped with their own power source, which is usually in the form of a battery and therefore has a limited capacity.

Since, in most cases, the communication network is a wireless communication network (such as a cellular communication network), a strict usage of power is dictated. Specifically, as the amount of load or congestion over the communication network varies over time affecting the traffic, so does the power consumption that is required for transmitting a specific amount of data from the sensors.

Some solutions for power management on the network level are known in the art for sensory network. For example, WIPO publication No. WO 2012/167807 aims to reduce congestion and perform load balancing on a communication network. This requires knowledge of the activities of multiple devices communicating over the network. The objective is taken from the network perspective and while improving bandwidth, performance, and efficiency of the network at large, it might actually compromise or damage the power consumption of a particular transmission node. For example, in a case of a network interference at a specific hour in the day, the network may observe that nodes are not transmitting and instruct a specified node to go and transmit at that hour, which will inevitably lead to an increase of power consumption at this node because of the interferences.

Therefore, it would be advantageous to provide a method to use knowledge of the power consumption at the transmission node, in order to schedule transmission time slots of data obtained by on-site sensors over such a wireless channel established by the transmission node, for reducing the power consumption at the transmission node.

SUMMARY OF THE INVENTION

According to some embodiments of the present invention, a method and a system for rescheduling transmit schemes of a network-connected measurement unit based on wireless network parameters is provided herein. The method may include the following steps: obtaining, over a specified period of time, transmit and receive characteristics of wireless network, connecting a specified measurement unit with wireless capabilities; determining a preferred schedule for transmit and receive sessions between said specified measurement unit and said at wireless network, wherein said preferred scheduled is calculated for reducing power consumption at the specified measurement unit; and initiating transmit and receive session at the specified measurement unit based on the preferred schedule.

These additional, and/or other aspects and/or advantages of the present invention are set forth in the detailed description which follows.

BRIEF DESCRIPTION OF THE DRAWINGS

For a better understanding of the invention and in order to show how it may be implemented, references are made, purely by way of example, to the accompanying drawings in which like numerals designate corresponding elements or sections. In the accompanying drawings.

The drawings together with the following detailed description make the embodiments of the invention apparent to those skilled in the art.

DETAILED DESCRIPTION OF THE INVENTION

With specific reference now to the drawings in detail, it is stressed that the particulars shown are for the purpose of example and solely for discussing the preferred embodiments of the present invention, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings makes apparent to those skilled in the art how the several forms of the invention may be embodied in practice.

Before the embodiments of the invention are explained in detail, it is to be understood that the invention is not limited in its application to the details of construction and the arrangement of the components set forth in the following descriptions or illustrated in the drawings. The invention is applicable to other embodiments and may be practiced or carried out in various ways. Also, it is to be understood that the phraseology and terminology employed herein is for the purpose of description and should not be regarded as limiting.

Figure 1:
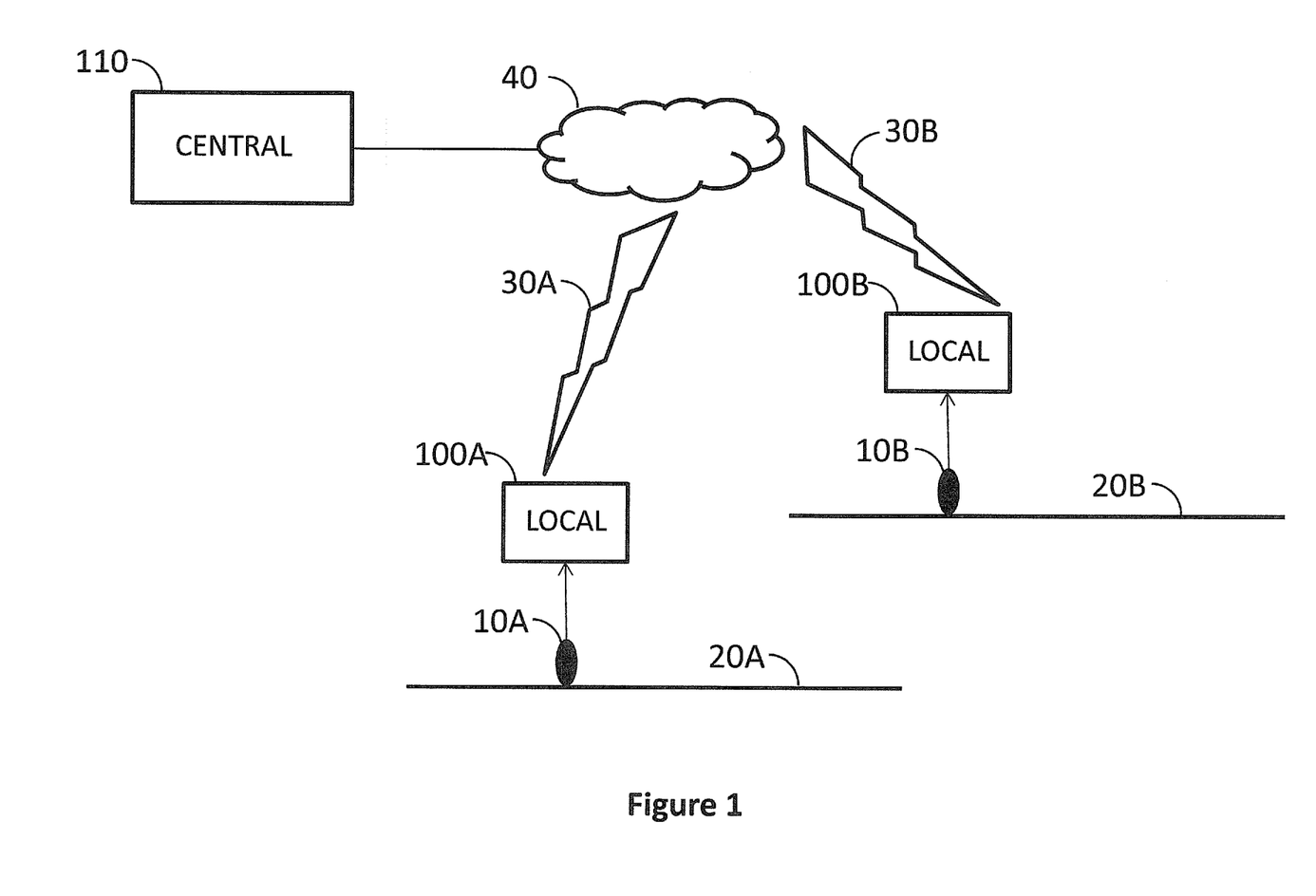
FIG. 1 is a schematic block diagram illustrating the system in accordance with some embodiments of the present invention.

Communication networks are dynamic in terms of loads, performance, bandwidth, interference and the like. The energy required to transmit over these networks is varying accordingly. According to some embodiments of the present invention, it is suggested that the network behavior is predictable, and the knowledge on how the network is behaving traffic-wise can be leveraged for scheduling transmit times of sensors connected via the network FIG. 1 is a schematic block diagram of a system illustrating some embodiments of the present invention. A plurality of local communication devices 100A and 100B, each having its respective sensor 10A and 10B coupled to a respective infrastructure 20A and 20B, are shown. Plurality of local communication devices 100A and 100B are connected over respective wireless channels 30A and 30B to a wireless network 40 and possibly to a central processing unit 110.

In operation, each of plurality of local communication devices 100A and 100B investigates the activity over wireless network 40 as reflected via its respective wireless channel 30A and 30B, respectively. It then utilizes this knowledge to initiate data transmission sessions such that power consumption is being reduced.

Figure 2:
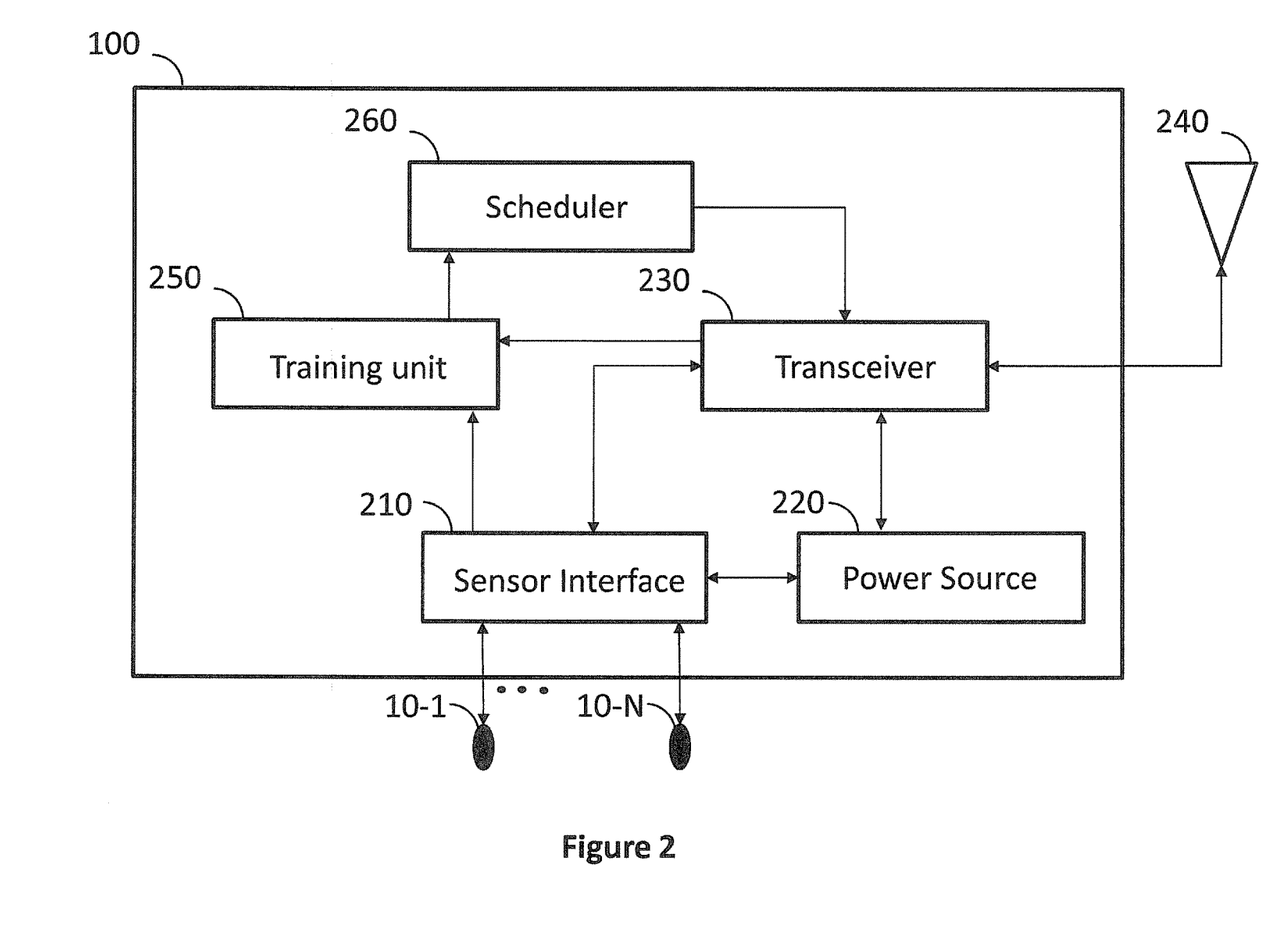
FIG. 2 is a schematic block diagram illustrating the system in greater details accordance with some embodiments of the present invention.

FIG. 2 is an exemplary non-limiting architecture of such a communication device in accordance with some embodiments of the present invention. Exemplary communication device 100 may include a sensor interface 210 configured to be connected to one or more sensors 10-1 to 10-N which in turn are couplable to respective pieces of infrastructure to be measured. Power may be fed by sensor interface 210 to respective sensors 10-1 to 10-N by power source 220. Data collected from sensors 10-1 to 10-N by sensor interface 210 is destined for transmission over the wireless channel by transceiver 230 and antenna 240. Training unit 250 may comprise one or more processors configured to monitor the activity at the wireless channel established by transceiver 230 and antenna 240 in at least power consumption terms and possibly in terms of other metrics such as SNR and other qualitative parameters. The knowledge about the characteristics of the network is then used by scheduler 260 to calculate transmission time slots at which transceiver 230 will transmit the data collected from sensors 10-1 to 10-N in such a way that the power consumption of transceiver 230, and possibly of all other components of communication device 100, is reduced.

According to some embodiments of the present invention, it is suggested to collect statistical information of network characteristics (usually time-varying ones), either while transmitting the data from the sensors or on designated time slots. The collected network parameters are then analyzed, and characteristics of network behavior may be deduced over time.

Exemplary, non-limiting network characteristics associated with the transmission may include: signal quality, possibly in the form of received signal strength indicator (RSSI), bit error rate (BER), duration of the transmission, and total power consumption utilized over the entire duration of the transmission. The bandwidth which is an efficiency criterion, may be derived from the network parameters and then serve as a factor for determining cost-benefit analysis of the scheduler.

According to some embodiments of the present invention, the aforementioned network characteristics are being weighted together, possibly using a tailored cost function, to construct a single scalar cost value for each transmission time slot.

While the network can be analyzed and the various time-slots may be associated with different costs in power consumption terms, every sensor in the field has its own predefined data transmissions interval. The duration of these intervals vary based on the nature of the infrastructure system that is being monitored.

Some infrastructure systems have a maximal interval during which a transmission has to be made. Real-life intervals may include for example: every four hours or 12 hours or 24 hours.

Weighing in the cost (in power consumption terms) of the various time slots, and the transmission interval requirements applied to the sensors in the network, it would be possible to apply the following methodology in order to reduce the amount of energy required to transmit data from sensors onto the wireless network:

When a sensor is deployed in the field and upon the infrastructure system, it begins to collect information about the communication network around it. The data collection process could potentially be carried out while a standard transmission data event is scheduled or it could initiate transmission attempts in different time slots, just in order to collect the data.

Figure 3:
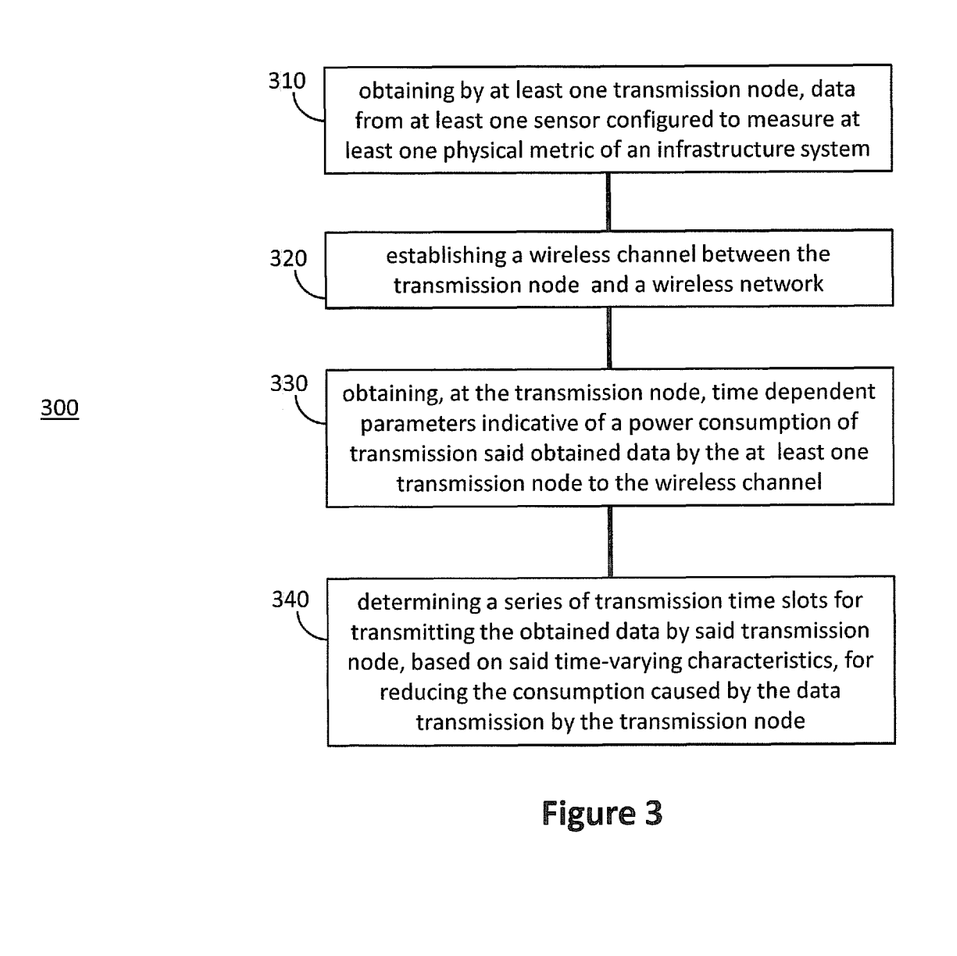
FIG. 3 is a high level flowchart illustrating the method in accordance with some embodiments of the present invention.

FIG. 3 is a flowchart according to some embodiments of the present invention. Method 300 is a method for determining a transmit schemes of a network-connected measurement unit based on wireless network time-varying characteristic. Method 300 may include the following steps: obtaining by at least one transmission node, data from at least one sensor configured to measure at least one physical metric of an infrastructure system 310; establishing a wireless channel between said transmission node and a wireless network 320; obtaining, at said transmission node, time dependent parameters indicative of a power consumption of transmission of said obtained data by said at least one transmission node to said wireless channel 330; and determining a series of transmission time slots for transmitting said obtained data by said transmission node, based on said time-varying characteristics, for reducing the consumption caused by the data transmission by said transmission node 340.

Figure 4:
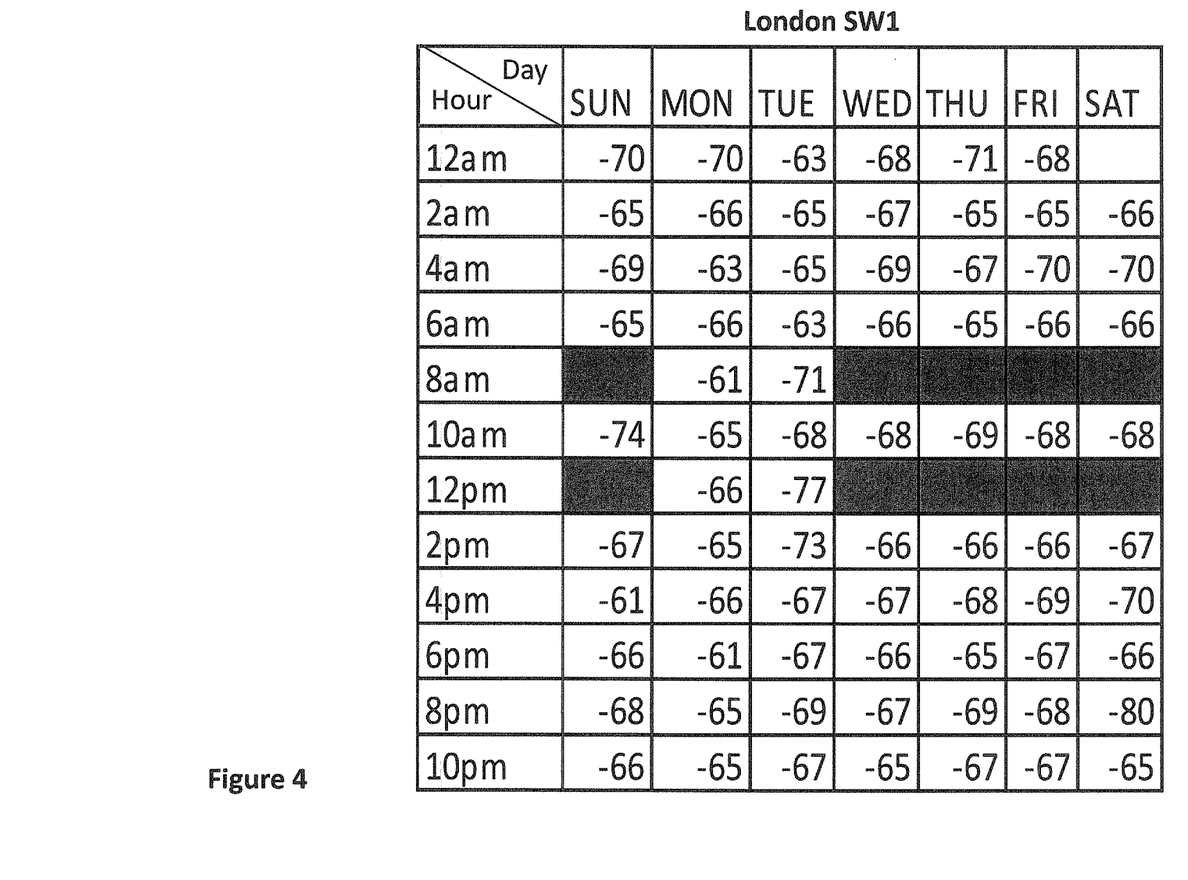
FIG. 4 is a timetable diagram illustrating wireless channel characteristics as an aspect according to some embodiments of the present invention.

FIG. 4 is a timetable diagram illustrating wireless channel characteristics as an aspect according to some embodiments of the present invention. The table show real time data retrieved from an actual wireless network (here a cellular network located at London SW1) where various time slots for transmission are associated with some kind of channel metric (here the attenuation of the channel in measured in dBm). This table forms the basis for the aforementioned decision making process of the scheduler. Specifically, the traffic limitations of the network are indicated as the metric being used, and further constraints as will be explained below are being used in order to solve the most power efficient transmit scheduling plan. Following is an explanation of how this problem is being solved by representing it as an optimization problem solved by constructing a direct acyclic graph (DAG).

The graph construction may be based on nodes that correspond to transmission time slots. The edges correspond to valid (in terms on $T_{max}/T_{min}$) consecutive transmission slots. Weights on the edges correspond to the transmission cost of the destination node, minus the 'preference' discount that the destination node has.

Figure 5:
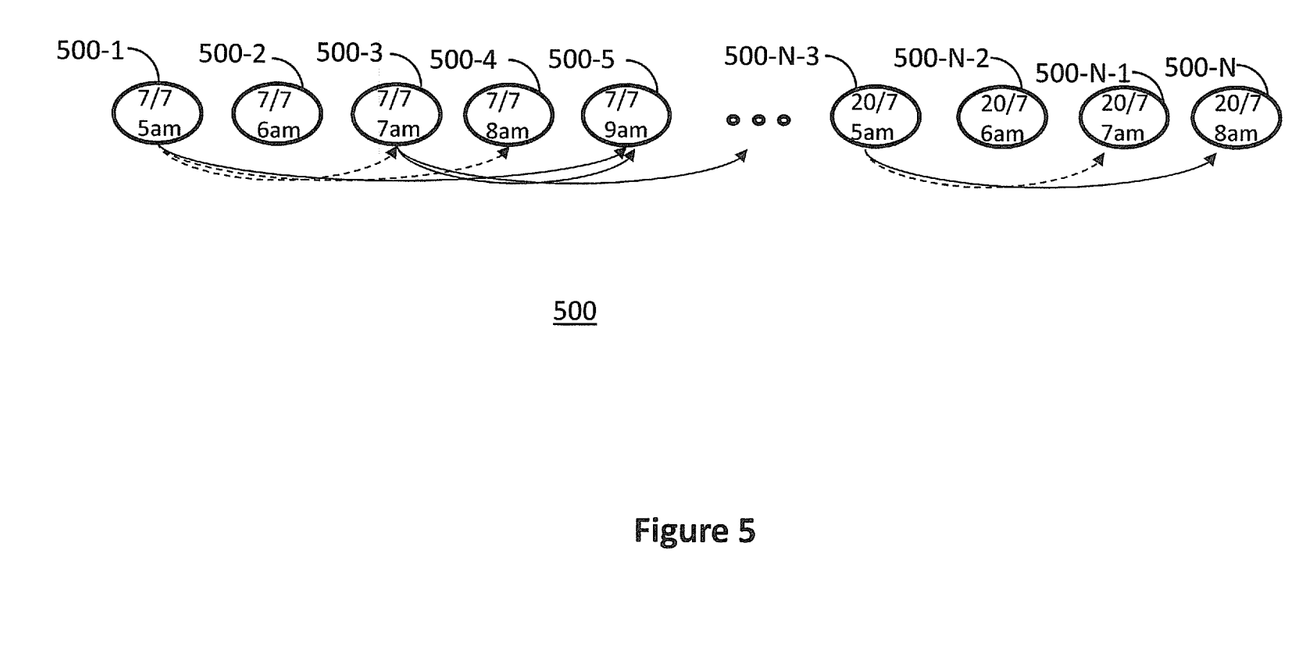
FIG. 5 is a graph diagram illustrating an aspect of the method according to some embodiments of the present invention.

FIG. 5 is an exemplary graph diagram illustrating one aspect according to some embodiments of the present invention. Following is an explanation of a sample graph that was constructed to represent the next 30-days of the network. Solving for shortest-path may be carried out, for example, by applying Bellman-Ford or Dijkstra algorithms. The shortest path represents the most energy-efficient transmission plan that meets both the constraints and preferences. It should be noted that the scheduling based on the shortest path can be also be derived by other methods such as dynamic programming.

Various nodes 500-1 to 500-N indicate valid time slots in which data collected from the sensors may be transmitted over the wireless network. The graph edges denote the sequence of transmission—which time slot will follow after a transmission has been made in a specified time slot. As illustrated in the example set herein, a transmission at 5 a.m. on July $7^{th}$ (node 500-1) may be followed by a transmission at 7 a.m., 8 a.m. or 9 a.m. same day (nodes 500-3 to 500-5) but not at 6 am same day (node 500-2) because of the $T_{min}$ requirement, and not at 5 a.m. on July $8^{th}$ or later (nodes 500-N-3 to 500-N) because of the $T_{max}$ requirement.

It should be understood that the shortest graph calculation is merely an example, and the scheduling may be calculated by various other methods, such as dynamic programming.

As will be appreciated by one skilled in the art, aspects of the present invention may be embodied as a system, method or an apparatus. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit, "module" or "system."

The aforementioned flowchart and block diagrams illustrate the architecture, functionality, and operation of possible implementations of systems and methods according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment, "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is understood that, from an implementation point of view, the actual computation such as constructing the graph and solving of the graph may be carried out either on the device, locally, or on the aforementioned central server.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method of reducing power consumption at a transmission node being a part of a wireless network, the method comprising:

obtaining by at least one transmission node, physically connected to at least one sensor, data from the at least one sensor configured to measure at least one physical metric;
establishing a wireless channel between said transmission node and a wireless network;
obtaining, at said transmission node, time dependent parameters indicative of a power consumption of transmission of said obtained data by said at least one transmission node to said wireless channel; and
determining a series of transmission time slots for transmitting said obtained data by said transmission node, based on said time-varying characteristics, for reducing the power consumption caused by the data transmission by said transmission node.

2. The method according to claim 1, wherein said obtaining of time-varying characteristics of said wireless network is carried out over a training period.

3. The method according to claim 1, wherein said obtaining of time-varying characteristics of said wireless network is carried out by associating cost, in power consumption terms, to each possible transmission time slot.

4. The method according to claim 3, wherein said cost is directly measured while transmitting the data from the transmission node over the wireless channel.

5. The method according to claim 3, wherein said cost is derived from a traffic level of the wireless network as reflected by the wireless channel.

6. A method of reducing power consumption at a transmission node being a part of a wireless network, the method comprising:
obtaining by at least one transmission node, data from at least one sensor configured to measure at least one physical metric of an infrastructure system;
establishing a wireless channel between said transmission node and a wireless network;
obtaining, at said transmission node, time dependent parameters indicative of a power consumption of transmission of said obtained data by said at least one transmission node to said wireless channel; and
determining a series of transmission time slots for transmitting said obtained data by said transmission node, based on said time-varying characteristics, for reducing the consumption caused by the data transmission by said transmission node,
wherein the series of transmission time slots for transmitting are determined by finding a shortest path over a directed acyclic graph (DAG) whose nodes denote valid transmission time slots and edges are associated with a cost, in power consumption terms.

7. The method according to claim 6, wherein the valid transmission time slots are defined as time slots that define a maximal interval therebetween, beyond which data from the sensors is insufficiently fresh.

8. The method according to claim 7, wherein the valid transmission time slots are further defined as time slots that define a minimal interval therebetween, beyond which data from the sensors is redundant.

9. The method according to claim 1, wherein the reducing of overall power consumption of the data transmission is carried out by optimizing the amount of data transmitted per level of power consumed.

10. The method according to claim 1, further comprising analyzing in a central location, all series of transmission time slots of determined by a plurality of communication devices, for updating the time series based on the analysis.

11. A transmission node configured for reducing power consumption, comprising:
an input circuitry for obtaining data from at least one sensor physically connected to said transmission node, wherein the at least one sensor is configured to measure at least one physical metric of an infrastructure system;
a communication circuitry for establishing a wireless channel between said transmission node and a wireless network;
a processor for
obtaining, at said transmission node, time dependent parameters indicative of a power consumption of transmission of said obtained data by said least one transmission node to said wireless channel; and
determining a series of transmission time slots for transmitting said obtained data by said transmission node, based on said time-varying characteristics, for reducing overall power consumption of the data transmission by said transmission node.

12. The transmission node according to claim 11, wherein said obtaining of time-varying characteristics of said wireless network is carried out over a training period.

13. The transmission node according to claim 11, wherein said obtaining of time-varying characteristics of said wireless network is carried out by associating cost, in power consumption terms, to each possible transmission time slot.

14. The transmission node according to claim 13, wherein said cost is directly measured while transmitting the data from the sensor over the wireless channel.

15. The transmission node according to claim 13, wherein said cost is derived from a traffic level of the wireless network as reflected by the wireless channel.

16. A transmission node configured for reducing power consumption, comprising:
an input circuit for obtaining data from at least one sensor configured to measure at least one physical metric of an infrastructure system;
a communication circuitry for establishing a wireless channel between said transmission node and a wireless network;
a processor for
obtaining, at said transmission node, time dependent parameters indicative of a power consumption of transmission of said obtained data by said least one transmission node to said wireless channel; and
determining a series of transmission time slots for transmitting said obtained data by said transmission node, based on said time-varying characteristics, for reducing overall power consumption of the data transmission by said transmission node,
wherein the series of transmission time slots for transmitting are determined by finding a shortest path over a directed acyclic graph (DAG) whose nodes denote valid transmission time slots and edges are associated with a cost, in power consumption terms.

17. The transmission node according to claim 16, wherein the valid transmission time slots are defined as time slots that define a maximal interval therebetween, beyond which data from the sensors is insufficiently fresh.

18. The transmission node according to claim 17, wherein the valid transmission time slots are further defined as time slots that define a minimal interval therebetween, beyond which data from the sensors is redundant.

19. The transmission node according to claim 11, wherein the reducing of overall power consumption of the data transmission is carried out by optimizing the amount of data transmitted per level of power consumed.

20. The transmission node according to claim 11, further comprising analyzing in a central location, all series of transmission time slots of determined by a plurality of communication devices, for updating the time series based on the analysis.

\* \* \* \* \*